United States Patent
Andrew et al.

(10) Patent No.: US 11,972,511 B2
(45) Date of Patent: Apr. 30, 2024

(54) ACCESSIBLE NEURAL NETWORK IMAGE PROCESSING WORKFLOW

(71) Applicant: Carl Zeiss X-ray Microscopy Inc., Dublin, CA (US)

(72) Inventors: Matthew Andrew, Livermore, CA (US); Lars Omlor, Pleasanton, CA (US); Andriy Andreyev, Dublin, CA (US); Christoph Hilmar Graf Vom Hagen, Oakland, CA (US)

(73) Assignee: Carl Zeiss X-ray Microscopy, Inc., Dublin, CA (US)

( * ) Notice: Subject to any disclaimer, the term of this patent is extended or adjusted under 35 U.S.C. 154(b) by 196 days.

(21) Appl. No.: 17/372,019

(22) Filed: Jul. 9, 2021

(65) Prior Publication Data

US 2023/0009951 A1    Jan. 12, 2023

(51) Int. Cl.
 *G06F 18/211* (2023.01)
 *G06F 18/21* (2023.01)
 (Continued)

(52) U.S. Cl.
 CPC ......... *G06T 11/006* (2013.01); *G06F 18/211* (2023.01); *G06F 18/214* (2023.01);
 (Continued)

(58) Field of Classification Search
 CPC ......... G06T 7/0012; G06T 2207/20081; G06T 2207/20084; G06T 2207/10081;
 (Continued)

(56) References Cited

U.S. PATENT DOCUMENTS 10,032,281 B1   7/2018  Ghesu et al.
11,077,320 B1 *  8/2021  Hibbard ................. G16H 20/40
 (Continued)

FOREIGN PATENT DOCUMENTS

JP      2020-092739        6/2020
KR      20210016896 A  *   2/2021

OTHER PUBLICATIONS

Search machine translation of KR 2021-0016896 A to Jonhchul, retrieved Apr. 1, 2023, 23 pages. (Year: 2023).*
(Continued)

*Primary Examiner* — Matthew C Bella
*Assistant Examiner* — Dennis Rosario
(74) *Attorney, Agent, or Firm* — NIXON PEABODY LLP; Jeffrey L. Costellia

(57) ABSTRACT

Improved (e.g., high-throughput, low-noise, and/or low-artifact) X-ray Microscopy images are achieved using a deep neural network trained via an accessible workflow. The workflow involves selection of a desired improvement factor (x), which is used to automatically partition supplied data into two or more subsets for neural network training. The neural network is trained by generating reconstructed volumes for each of the subsets. The neural network can be trained to take projection images or reconstructed volumes as input and output improved projection images or improved reconstructed volumes as output, respectively. Once trained, the neural network can be applied to the training data and/or subsequent data—optionally collected at a higher throughput—to ultimately achieve improved de-noising and/or other artifact reduction in the reconstructed volume.

45 Claims, 4 Drawing Sheets

(51) Int. Cl.
*G06F 18/214* (2023.01)
*G06N 3/0475* (2023.01)
*G06N 3/08* (2023.01)
*G06N 3/0985* (2023.01)
*G06T 11/00* (2006.01)

(52) U.S. Cl.
CPC ...... *G06F 18/2163* (2023.01); *G06F 18/2178* (2023.01); *G06N 3/0475* (2023.01); *G06N 3/08* (2013.01); *G06N 3/0985* (2023.01); *G06T 2211/432* (2013.01); *G06T 2211/441* (2023.08)

(58) Field of Classification Search
CPC .......... G06T 15/08; G06T 2207/10072; G06T 5/002; G06T 2207/10056; G06T 11/003; G06T 5/003; G06T 11/005; G06T 2207/20021; G06T 2207/10076; G06T 2207/10061; G06T 2211/40; G06T 2211/436; G06T 2211/432; G06T 3/4046; G06T 2207/10116; G06T 2210/41; G06T 2207/30004; G06T 2207/10104; G06T 2207/10108; G06T 2207/10101; G06T 2211/421; G06T 2211/441; G06T 2200/04; G06T 2207/10084; G06N 3/045; G06N 3/08; G06N 20/00; G06N 3/02; G06N 20/20; G06N 3/0464; G06N 3/0985; G06N 3/0475; G06N 3/094; G06N 3/0455; A61B 6/032; A61B 6/03; A61B 6/037; G06V 2201/03; G06V 10/82; G06V 10/774; G06V 10/25; G06V 2201/122; G06V 20/69; G06V 10/30; G06V 10/70; G06V 10/242; G06F 18/214; G06F 18/2413; G06F 18/2155; G06F 18/2148; G06F 18/211; G06F 18/2115; G06F 18/2113; G06F 18/2111; G16H 30/40; G01R 33/481; G01R 33/4812; G01R 33/4808; A61F 2002/30948; A61F 2/30942
See application file for complete search history.

(56) References Cited

U.S. PATENT DOCUMENTS

| | | | |
|---|---|---|---|
| 2003/0179918 A1* | 9/2003 | Kohler | A61B 6/037 382/131 |
| 2005/0008206 A1 | 1/2005 | Kawano | |
| 2017/0206681 A1 | 7/2017 | Choi et al. | |
| 2017/0344848 A1* | 11/2017 | Lin | G06V 10/454 |
| 2018/0144214 A1* | 5/2018 | Hsieh | G06T 7/0002 |
| 2020/0034999 A1 | 1/2020 | Van Heteren et al. | |
| 2021/0272240 A1* | 9/2021 | Litwiller | G06T 5/002 |
| 2022/0028085 A1* | 1/2022 | Vasilev | G16H 30/40 |
| 2022/0236782 A1* | 7/2022 | Viswanathan | H04N 7/147 |
| 2023/0230297 A1* | 7/2023 | Goedicke | G06T 11/005 382/128 |

OTHER PUBLICATIONS

Hooper et al., Impact of Upstream Medical Image Processing on Downstream Performance of a Head CT Triage Neural Network, Apr. 28, 2021 [retrieved Dec. 13, 2023], Radiology: Artificial Intelligence, vol. 3, No. 4, pp. 1-9. Retrieved: https://pubs.rsna.org/doi/full/10.1148/ryai.2021200229 (Year: 2021).*

Lagerwerf et al., Noise2Filter: fast, self-supervised learning and real-time reconstruction for 3D computed tomography, Dec. 1, 2020 [retrieved Dec. 13, 2023], Machine Learning: Science and Technology, vol. 2, No. 1, 15 pages. Retrieved: https://iopscience.iop.org/article/10.1088/2632-2153/abbd4d/meta (Year: 2020).*

Wang et al., Consensus equilibrium framework for super-resolution and extreme-scale CT reconstruction, Nov. 2019 [retrieved Dec. 13, 2023], SC '19: Proceedings of the International Conference for High Performance Computing, Networking, Storage and Analysis, 23 pages. Retrieved: (Year: 2019) https://dl.acm.org/doi/abs/10.1145/3295500.3356142 (Year: 2019).*

Lehtinen et al., "Noise2Noise: Learning Image Restoration without Clean Data", *Proceedings of the 35th International Conference on Machine Learning*, PMLR 80, 2018, (12 pages).

Written Opinion for Application No. PCT/US2022/036452, dated Nov. 16, 2022 (4 pages).

* cited by examiner

ACCESSIBLE NEURAL NETWORK IMAGE PROCESSING WORKFLOW

TECHNICAL FIELD

The present disclosure relates to X-ray imaging generally and more specifically to improvements in de-noising workflows for X-ray microscopy.

BACKGROUND

X-ray Microscopy Imaging is a field of imaging that is used to acquire imaging data for many different types of samples across many different use cases. X-ray Microscopy Imaging has found uses in biology (e.g., imaging biomaterials, soft tissues, and the like), material science (e.g., imaging the internal microstructure of a material), manufacturing (e.g., non-destructively imaging internal components), and many other fields. Individual images (e.g., projections) can be acquired by directing radiation from an X-ray source, through a sample, towards a detector. Multiple projections can be acquired for a single sample by rotating the direction of travel of the X-ray radiation with respect to the sample (e.g., rotating the X-ray source and detector with respect to the sample). Often, the acquired imaging data (e.g., containing multiple projections) is used to generate a three dimensional reconstructed volumes of the sample that was imaged, such as through the use of computed tomography (CT).

While X-ray Microscopy Imaging provides best-in-class spatial resolution, it suffers from relatively low throughput. This low throughput is especially problematic when using analytical image reconstruction algorithms. For example, to generate a reconstructed volume of a sample with suitably useful quality (e.g., low noise and low aliasing) using conventional techniques, it is necessary to acquire at least a minimum number of projections, each from various angular locations around the sample. As the number of required projections increase, the time required to acquire all of the imaging data increases.

Low throughput carries with it many problems, such as longer overall time to image an object, which can reduce the number of objects that may be imaged in a working day and limit the ability to proceed with a project until after imaging has completed; undesirable blur when imaging moving samples (such as for in situ experiments); more overall emitted radiation, which can damage the sample and can increase maintenance costs of an imager; and others.

Currently, when higher throughput is desired, the quality of the imaging data decreases. Traditional techniques have been used to try and compensate for this quality decrease, but they come with their own problems and are not always sufficient or suitable for various use cases. Examples of some traditional techniques include low-pass filtering either in a projection domain pre-reconstruction or in a volume domain post-reconstruction. Iterative model-based reconstruction has also been applied, which can provide decent image quality gains, but has proven to be an unpopular technique due to the slower image reconstruction speed and complicated parameter tuning as compared to analytical methods.

More recently, Machine Learning (ML) techniques have been proposed to offer superior quality as compared to traditional image processing methods. However, these ML models must be carefully trained through complex and task-dependent workflows, requiring expert knowledge of both machine learning and the selected image modality (e.g., CT) to achieve suitable results. Without such knowledge, the ML model can become biased and may not achieve sufficiently strong performance. In some cases, a poorly trained model can even result in entirely unexpected results, such as an incorrect or impossible reconstructions. Thus, to ensure results of sufficient quality and accuracy, it can be necessary to employ suitable experts whenever an ML model is being trained (e.g., for each sample, for each type of sample, for each unique combination of sample and imaging parameters, and the like). Thus, current ML models are inaccessible to many applications and can be very expensive (e.g., due to the costs involved in hiring suitable experts). As a result, instances where ML models might have provided improved image quality must instead be processed using less effective techniques.

There is a need for techniques that allow for increased throughput while also enabling high-quality (e.g., low-noise and/or low-artifact) images to be acquired. There is a need for widely accessible techniques to achieve such results. There is a need for techniques that enable easy and accessible training of neural networks, especially for the purpose of de-noising X-ray imaging data.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, supplemented by this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure include a method that comprises receiving training data of a sample. The training data is acquired by an X-ray imager using training parameters. The method further comprises receiving an improvement selection, such as a selection to improve throughput or a selection to improve image quality at the same throughput. The method further comprises partitioning the training data into a plurality of training subsets using the improvement selection (e.g., the throughput or image quality selection). The method further comprises generating a computed tomography (CT) training reconstructed volume for each of at least two of the plurality of training subsets. The method further comprises training a neural network using each of the CT training reconstructed volumes. The method further comprises receiving additional imaging data of the sample (e.g., additional imaging data of the same sample, such as a different region of interest, or additional imaging data of a subsequent sample in the scan series acquired under similar imaging conditions). The additional imaging data is acquired by the X-ray imager using additional parameters. The method further comprises generating a CT reconstructed volume using the additional imaging data and the trained neural network.

Embodiments of the present disclosure include a method that comprises receiving training data of a sample. The training data is acquired by an X-ray imager using training parameters. The method further comprises receiving an improvement selection, such as a selection to improve throughput or a selection to improve image quality at the same throughput. The method further comprises partitioning the training data into a plurality of training subsets using the improvement selection (e.g., the throughput or image quality selection). The method further comprises training a neural network using each of the training subsets. Training the neural network includes generating de-noised) imaging data for each of the training subsets using the neural network. Training the neural network further includes evaluating the neural network using the improved imaging data. The method further comprises receiving additional imaging data (e.g., additional imaging data of the same sample, such as a different region of interest, or additional imaging data of a subsequent sample in the scan series acquired under similar imaging conditions). The additional imaging data is acquired by the X-ray imager using additional parameters. The method further comprises generating improved additional imaging data using the additional imaging data and the trained neural network. The method further comprises generating a CT reconstructed volume using the improved additional imaging data.

Embodiments of the present disclosure include a system comprising a control system including one or more processors and a memory having stored thereon machine readable instructions, wherein the control system is coupled to the memory and any of the aforementioned methods is implemented when the machine executable instructions in the memory are executed by at least one of the one or more processors of the control system.

Embodiments of the present disclosure include a system for processing X-ray imaging data, the system including a control system configured to implement any of the aforementioned methods.

Embodiments of the present disclosure include a computer program product embodied on a non-transitory computer readable medium and comprising instructions which, when executed by a computer, cause the computer to carry out any of the aforementioned methods.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
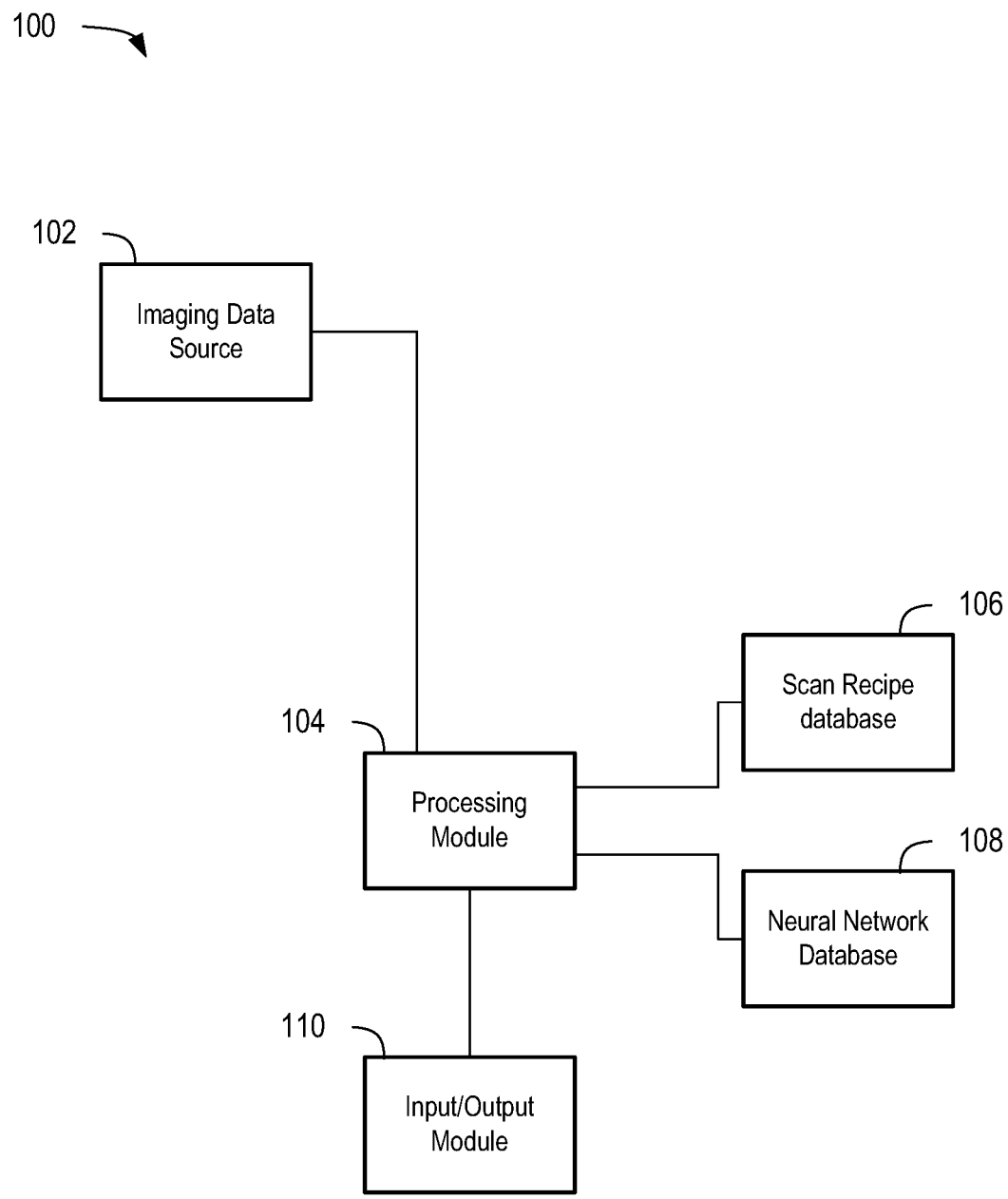
FIG. 1 is a schematic diagram depicting an imaging data processing system, according to certain aspects of the present disclosure.

Certain aspects and features of the present disclosure relate to a technique to achieve improved (e.g., high-throughput, low-noise, or low-artifact) X-ray Microscopy images and/or volume reconstructions through the use of a deep neural network trained via an accessible workflow. One aspect of the present disclosure is a novel workflow for training image de-noising networks (e.g., with major focus on CT de-noising and antialiasing) that do not require expert knowledge in machine learning. Rather, training of the image (including a volume composed of voxels) de-noising networks can be achieved by those having only a basic knowledge about the imaging modality (e.g., CT). The workflow involves selection of a desired improvement factor (x), which is used to automatically partition supplied data into two or more training subsets for neural network training. The deep neural network (DNN) can be applied and trained in the projection domain or the volume domain. When applied in the projection domain, the neural network can take projection images as input and can output improved (e.g., de-noised) projection images, which can then be used to generate an improved reconstructed volume. Training of the neural network in this projection domain can be based on evaluation of the improved projection images and/or the improved reconstruction volume. When applied in a volume domain, the neural network can take a reconstructed volume (e.g., individual reconstructed volumes for each training subset during training of the neural network) as input and can output an improved (e.g., de-noised) reconstructed volume. Once trained, the neural network can be applied to the training data and/or subsequent data—optionally collected at a higher throughput—to ultimately achieve improved de-noising and/or other artifact reduction (e.g., antialiasing) in the reconstructed volume. In some cases, the subsequent data can be collected at a higher throughput than the training data, such as a throughput at or approximately x times higher (e.g., via collection of 1/x times as many projections).

During X-ray Microscopy procedures, radiation is emitted from one or more emitters (X-ray sources) and is directed to one or more detectors. A sample (e.g., a subject being analyzed) located between the emitter(s) and detector(s) can affect the amount of radiation received by the detector(s), such as by absorbing, reflecting, or otherwise affecting the radiation incident on and/or passing through the sample. The resultant information collected by the detector(s) can be known as data or imaging data. As used herein, the terms scan or scanning can refer to the acquisition of imaging data, optionally during movement of the sample with respect to the emitter(s) and/or detector(s). As used herein, the term computed tomography (CT) is intended to include the use of X-ray imaging data to generate a three-dimensional reconstructed volume of a sample. A three-dimensional reconstructed volume can be a data set indicative of the three-dimensional structure or a three-dimensional image of the sample (e.g., a three-dimensional image composed of voxels).

Certain aspects and features of the present disclosure can be used to generate improved two-dimensional images (e.g., improved imaging data or improved projection images) and/or improved three-dimensional images (e.g., improved CT reconstructed volumes). While described herein with reference to CT reconstructed volumes, other three-dimensional or quasi-three-dimensional reconstructed volumes or images can be used instead or in addition to CT reconstructed volumes, such as laminography reconstructions.

Sufficient imaging data (e.g., training data) collected through the sample from different angles can be used to generate a set of two-dimensional projection images that can then be used to generate a three-dimensional reconstructed volume of the sample. As used herein, the term angle is generally intended to designate an angle around an axis of the sample (e.g., around the Z-axis). Imaging data collected at a single angle can be known as a projection. Thus, to generate a three-dimensional reconstructed volume of a sample, a minimum number of projections must be acquired from multiple angles around the sample. The minimum number of projections can be determined in any suitable fashion. The minimum number of projections given by Nyquist sampling parameters is based on the number of pixels being acquired and can be approximated as pi/2 multiplied by the number of pixels. Since each projection requires time to acquire, larger numbers of projections involve longer imaging times.

Golden ratio angle determination techniques can be used to determine an especially useful set of angles used to separate subsequent projections. The golden ratio angle determination techniques involve using the golden ratio $$\left(\varphi = \frac{1 + \sqrt{5}}{2}\right)$$

to separate subsequent projections such that any number of projections can be acquired without overlapping a previous projection. In an example, the golden angle for a semicircle can be defined as $$\theta_{gold} = \frac{360}{\varphi^2} = 137.51\ldots°.$$

Therefore, each subsequent projection is acquired at a direction rotated by the golden angle from the previous projection.

Once the two-dimensional imaging data is collected (e.g., from a minimum number of angles), a reconstruction technique is used to transform the imaging data from the projection domain into a three-dimensional reconstructed volume of the sample in the volume domain. Conventional reconstruction techniques, such as filtered backward projection (FBP), generally require relatively large numbers of projections to generate accurate reconstructed volumes. When too few projections are used, the resultant reconstructed volume can be of poor quality, such as due to increased noise, increased aliasing, increased angular artifacts, or other artifacts.

Deep neural networks (DNNs) can be used to generate or improve imaging data or a reconstructed volume, but must be properly trained. A DNN trained on a training subject may not perform well on a different sample, especially if the subject and the sample are different types of samples (e.g., different materials or a substantially different structural makeup) or if the imaging geometry and/or X-ray source setting differs significantly from that used in acquiring the training data.

According to certain aspects of the present disclosure, a neural network can be improved by being trained on the actual sample imaging data being analyzed. Normally, this type of on-site neural network training would require substantial expertise in machine learning and neural network optimization to ensure the neural network is being trained well, since a poorly trained neural network can be very problematic. Certain aspects of the present disclosure include a workflow for training a neural network that is accessible to both experts and non-experts.

The workflow generally involves receiving input data, of which all or some will be used as training data. The input data, or at least the training data, can be acquired using known acceptable imaging parameters (e.g., sufficient exposure time with a minimum number of projections). The workflow continues with receiving an improvement selection (e.g., an improvement factor), partitioning the training data into two or more subsets based on the improvement selection, training a neural network (e.g., a DNN) using each of the subsets, receiving additional imaging data (e.g., some or all of the input data, separate data, or the like), and applying the neural network to the additional imaging data to ultimately generate an improved reconstructed volume. In some cases, a neural network can be applied (and trained) pre-reconstruction (e.g., in the projection domain) to take imaging data as input and output improved (e.g., de-noised) imaging data which is then used to generate a reconstructed volume. In some cases, a neural network can be applied (and trained) post-reconstruction (e.g., in the volume domain) to take a reconstructed volume as input and output an improved (e.g., de-noised) reconstructed volume. Reconstruction itself can be performed using conventional reconstruction techniques (e.g., conventional reconstructions algorithms). Thus, a machine learning or neural network expert is not required for any selection of and/or separation of training data, or for analysis of the performance of the trained neural network. Further, while the training data may be acquired at a certain throughput, the additional imaging data can be acquired at a higher throughput without hindering the neural network's ability to provide improvements to the imaging data and/or reconstructed volume. Further, the training data can be acquired from the same sample for which improved imaging data or an improved reconstruction volume is desired, or from a different sample (e.g., a different, but similar sample, such as a different sample of the same category as the sample for which improved imaging data or an improved reconstructed volume) using the same or similar acquisition parameters are those used to acquire imaging data of the sample for which improved imaging data or an improved reconstructed volume.

In some cases, a graphical user interface (GUI) can include any combination of one or more of a module for loading an input dataset, a module for selecting a neural network, a module for selecting the desired improvement (e.g., improvement factor, such as a throughput factor, a de-noising factor, or other artifact-improving factor), and a module for naming the trained neural network. In an inference stage, the GUI can provide a list of available pre-trained neural networks (DNNs), optionally based on user input or based on the input dataset (e.g., the input dataset itself or metadata associated with the input dataset). In some cases, the list of available pre-trained neural networks can include additional information, such as a preview image showing its application (e.g., an example sample for a category of samples). The GUI can provide an option to apply the selected neural network to the reconstructed volume, and can optionally provide options to remove or rename neural networks in the list.

The training data can be acquired using standard parameter settings for the given application, despite those standard parameters resulting in low throughput. The training data can include imaging data associated with multiple projections acquired at different angles or having other differences (e.g., different acceleration voltage of the X-ray source). The training data can be used to train a neural network on a projection-to-projection basis or a volume-to-volume basis. The training data is partitioned based on a selected improvement factor. This improvement factor can indicate the amount of throughput gain desired (e.g., 2 times, 4 times, 6 times, and the like). Partitioning can be at equal intervals and can be done in an interlaced fashion, although that need not always be the case. Some or all of the subsets can be used to generate projection images or volumes (e.g., three-dimensional reconstructions) that differ only in noise, aliasing artifact, or other artifacts (e.g., scattering, beamhardening, reflections, phase artifacts, oscillations, and the like), since the imaging object is identical in each of the projection images or volumes. Because the training data is automatically partitioned into subsets that differ only in undesired artifacts, training of the neural network using each of these subsets as individual input datasets (whether input in the projection domain or the volume domain) to achieve an output dataset (e.g., improved imaging data or improved reconstructed volume) will result in an output dataset having a reduction in these undesired artifacts.

In some cases, partitioning the training data into subsets based on subsequent projections can involve each subsequent projection having a different angular position than the previous projection. In an example, a collection of six projections ($\theta_1=10°$, $\theta_2=20°$, $\theta_3=30°$, $\theta_4=40°$, $\theta_5=50°$, $\theta_6=60°$) can be partitioned in an interlaced fashion into three training subsets: {$\theta_1=10°$, $\theta_4=40°$}, {$\theta_2=20°$, $\downarrow_5=50°$}, and {$\theta_3=30°$, $\theta_6=60°$}. Any number of projections can be used In some cases, such as when a golden ratio angle determination technique is used, $$\theta_{n+1} = \theta_n + \frac{360}{\varphi^2}.$$

In such cases, each subsequent projection in the training data will be acquired form a unique angle, ensuring that no projection in any of the training subsets will be acquired from the same angle as any projection in any of the other training subsets, Partitioning such that subsets contain imaging data with an angular offset from one another induces both a de-noising and an anti-aliasing effect in the resulting trained network. In some cases, training data can be optionally corrected, such as for the beamhardening, scatter, or other image quality degrading factors.

In some cases, imaging data for each subset can be optionally weighted to minimize effects of higher attenuation/scatter along certain view angles or limited angle tomographies, which can be especially useful for high aspect ratio samples. The reconstructed volumes for each subset can be optionally cropped to specific regions of interest (ROIs), emphasizing features of interest to further optimize the training process. In some cases, spatially dependent weighting masks (e.g. as a function of attenuation coefficient) can be applied as an alternative to ROI cropping. In some cases, reconstructed volumes for each subset can be truncated in a Z-direction to avoid the cone-beam artifact area.

As an alternative to splitting the training data into non-overlapping angles, the training data can be acquired in a repeated fashion (e.g., multiple acquisitions are obtained for the same angles). In an example, a collection of six projections ($\theta_1=10°$, $\theta_2=10°$, $\theta_3=10°$, $\theta_4=30°$, $\theta_5=30°$, $\theta_6=30°$) can be partitioned in an interlaced fashion into three training subsets: {$\theta1=10°$, $\theta_4=30°$}, {$\theta_2=10°$, $\theta_5=30°$}, and {$\theta_3=10°$, $\theta_6=30°$}. Such repeated acquisitions can act in the same fashion as the subsets and/or can be distributed into the subsets during partitioning. Because the neural network is trained using each of the subsets as individual inputs, this acquisition technique affects noise. However, because each of the subsets includes projections acquired from common angles, the trained neural network will not necessarily affect the aliasing structure of the data.

In some cases, imaging data acquired in a continuous rotation mode can be time-binned and split into training subsets (e.g., pairs) in a similar fashion as disclosed above. In some cases data acquired in a golden ratio scan mode (e.g., a scan mode in which projections or sequences of projections correspond to the golden angle sequence relative to previously acquired angles) can be subdivided into subsets in a similar fashion as disclosed above.

In some cases, instead of or in addition to angle, any combination of one or more other acquisition parameters (e.g., acceleration voltage of the X-ray source, X-ray filter, exposure time, etc.) can be altered across the training subsets. For example, subsets that differ in exposure time can be used to train a neural network to eliminate artifacts that may be caused by changes in exposure time.

The fully trained neural network can be automatically imported into the image processing GUI and can be applied to improve the image quality of either the dataset on which it was trained or on similar datasets (e.g., imaging data acquired using the same imaging configuration and/or similar samples). For such datasets, the number of projections can be decreased using the improvement factor and the number of subsets, reducing overall scan times.

In some cases, modifications to the workflow disclosed herein can facilitate minimizing other problems. For example, when scanning, geometrical parameters can be modified between subsets or source parameters, which can be used for phase contrast or dual energy (e.g., beamhardening) applications. Further, different angular ranges could be used between different subsets to train a neural network to reduce limited view artifacts (e.g., as in contrast to sparse angular sampling artifacts).

Certain aspects and features of the present disclosure provide a useful workflow that enables a user with minimal or no knowledge of machine learning or neural network optimization to simply select a desired amount of improvement (e.g., throughput gain) and then train a neural network to achieve that desired improvement (e.g., that desired amount of gain). The workflow also permits users to more quickly identify useful throughput gain amounts through feedback and evaluation, which can further reduce overall time to acquire useful imaging data, reconstructed volumes, trained neural networks, and other data. Additionally, certain aspects and features of the present disclosure enable image quality improvements even when no throughput gain is desired. For example, a neural network trained using an improvement factor at or above 2 can also be applied on imaging data acquired using non-reduced throughput (e.g., throughput with a 1× gain) or sub-reduced throughput (e.g., throughput with a gain between 1× and the improvement factor of the neural network) to provide image quality improvements without or with, respectively, accompanying throughput improvements. For example, for a neural network trained on training data acquired at a throughput associated with 1600 projections and using an improvement factor of 2, that neural network can be applied to imaging data also acquired at a throughput associated with 1600 projections (instead of 800 projections) to improve the image quality of the resultant reconstructed volume. In another example, that same neural network can be applied to imaging data acquired at a throughput associated with fewer than 1600 projections to improve the image quality and overall throughput of the resultant reconstructed volume. While a neural network may be trained using a certain improvement factor, that neural network can be applied to any desired imaging data. For example, if a 4× improvement factor is selected based on training data acquired at a throughput associated with 1600 projections, the trained neural network can be applied on any suitable imaging data, such as imaging data acquired at 400 projections, 390 projections, 410 projections, or any other suitable number of projections. In some cases, the trained neural network can be applied to imaging data having a number of projections that is equal to or approximately (e.g., within 1%, 2%, 3%, 4%, 5%, 6%, 7%, 8%, 9%, or 10% of) the number of projections used to train the neural network divided by the improvement factor.

While described with reference to imaging data acquired for X-ray microscopy, certain aspects and features of the present disclosure can be used to improve imaging data or generate improved reconstructed volumes for other tomographic imaging techniques, such as scanning electron microscopy (e.g., scanning transmission electron microscopy) or laminography. In some cases, imaging data can be acquired with limited angle tomography techniques and the automatic partitioning can partition the imaging data into subsets such that each subset includes imaging data associated with different angular ranges (e.g., angular ranges with different starting and/or ending points, and/or non-overlapping angular ranges). In some cases, partitioning of imaging data in laminography or similar techniques can involve partitioning the imaging data into subsets such that each subset includes imaging data associated with a different tilt or shift of the sample.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a schematic diagram depicting an imaging data processing system 100, according to certain aspects of the present disclosure. The imaging data processing system 100 (e.g., control system) can include an imaging data source 102 that provides imaging data to a processing module 104. The imaging data source 102 can be any suitable source of imaging data, such as an imager (e.g., an imaging machine, such as an X-ray microscope or a CT scanner), a database of imaging data, a local memory storing imaging data, a removable memory storing imaging data, or the like. Certain aspects and features of the present disclosure are especially useful when the imaging data source 102 is an imager, such as an X-ray microscope.

The processing module 104 can process imaging data from the imaging data source 102. In some cases, the processing module 104 can control the imaging data source 102. In some cases, the processing module 104 can access a scan recipe database 106 to retrieve a scan recipe (e.g., operating parameters) to use for a particular sample that is to be scanned. The scan recipe can define operating parameters such as acceleration voltage and power of X-ray source, X-ray filter, exposure time, number of projections, specific angle(s) used for projection(s), axial (e.g., X, Y, or Z) displacement per projection, and the like.

The processing module 104 can use the imaging data to train a neural network, such as an artificial neural network (ANN) (e.g., a deep neural network (DNN), a convolutional neural network (CNN), or the like), and/or use such a trained neural network to process imaging data or a reconstructed volume into improved imaging data or an improved reconstructed volume. The processing module 104 can also carry out reconstruction of imaging data (e.g., raw imaging data or improved imaging data) to generate reconstructed volumes (e.g., converting a set of acquired projections into a three-dimensional reconstructed volume). In some cases, the processing module 104 can access a pre-trained neural network from a neural network database 108, which can be applied as-is or can be further trained. In some cases, the pre-trained neural network can be a neural network that is generated using a federated learning technique, in which multiple trained neural networks can be collected and combined to generate a collaborative neural network that is distributed as the pre-trained neural network. In such cases, each pre-trained neural network can be associated with the same category of sample and/or the same or similar acquisition parameters, and the pre-trained neural network accessed by the processing module 104 can be accessed based on a provided category and/or set of acquisition parameters.

A pre-trained neural network can be selected based on user input, such as via the user selecting an individual pre-trained neural network from a list of available neural networks, or via the user providing information about the sample to be scanned, which information can be used to suggest and/or identify one or more pre-trained neural networks suitable for the sample. For example, a sample sharing the same or similar category information as that used to pre-train an neural network (whether via federated learning or not) may be able to use that pre-trained neural network with success. Category information can be information usable to identify a category to which a sample belongs. Any suitable types of categories can be used, such as "minerals," "calcium-rich samples," "skin tissue," and the like.

In some cases, a neural network trained using a processing module 104 can be stored in the Neural Network Database 108, optionally with additional information associated with the sample and/or the scan. Additional information associated with the sample can include identification information (e.g., a unique identifier or a description), category information (e.g., an indication as to the category to which the sample belongs), imaging data or a reconstructed volume of the sample generated using the neural network, imaging data or a reconstructed volume of a standardized set of imaging data (e.g., of a generic standardized sample or a specific standardized sample selected to be similar to the sample, such as having the same category). Additional information associated with the scan can include imager identification information (e.g., a model number of the X-ray imager, a model number or type of the X-ray source(s) and/or detector(s), and the like), scan recipe information (e.g., information about one or more parameters used in the scanning of the sample), and the like. Any information stored in the neural network database 108 in association with a pre-trained neural network can be used to help select a pre-trained neural network to use when processing imaging data from a new sample.

A scan recipe database 106 and a neural network database 108 can be implemented in separate databases or a combined database as part of the processing module 104 or separate module(s). In some cases, the scan recipe database 106 and the neural network database 108 are stored on a memory accessible locally or remotely (e.g., accessible via a network such as a local area network, a wide area network, a cloud network, or the Internet).

An input/output module 110 can be coupled to the processing module 104 to receive user input and provide output to a user. Any suitable input/output devices can be implemented in the input/output module 110, such as a keyboard, a mouse, a display (e.g., computer monitor), a touchscreen, light emitting diodes (LEDs) or other light sources, buttons, and the like. The processing module 104 can present training imaging data or reconstructed volumes and/or final (e.g., improved) imaging data or reconstructed volumes to a user via the input/output module 110. In some cases, the input/output module 110 can store imaging data, a reconstructed volume, and/or a trained neural network (e.g., on a local memory, removable memory, or network-accessible memory). In some cases, a neural network trained using a processing module 104 can be stored in association with the imaging data or reconstructed volume.

In some cases, any of the imaging data source 102, the processing module 104, the input/output module 110, the scan recipe database 106, and the neural network database 108 can be incorporated into one or more housings in any suitable combination. Any combination of one or more of the imaging data source 102, the processing module 104, the input/output module 110, the scan recipe database 106, and the neural network database 108 can be implemented locally (e.g., on the same device as one another or on devices coupled by a bus or local area network) or remotely (e.g., via a wide area network, the Internet, or a cloud network). In an example, a processing module 104 can be implemented on a user's laptop computer, the imaging data source 102 can be implemented on a cloud-based health record database (e.g., one or more servers accessible via the Internet), and the scan recipe database 106 and the neural network database 108 can be implemented on a separate cloud-based analysis database (e.g., one or more servers accessible via the Internet).

In another example, the processing module 104 can be incorporated into an imaging data source 102, such as a computer for processing imaging data that is also used to control an X-ray microscope. In another example, the processing module 104 can be incorporated into an individual computer that accesses, via a network-accessible database, imaging data supplied from a separate CT scanner or X-ray microscope.

Figure 2:
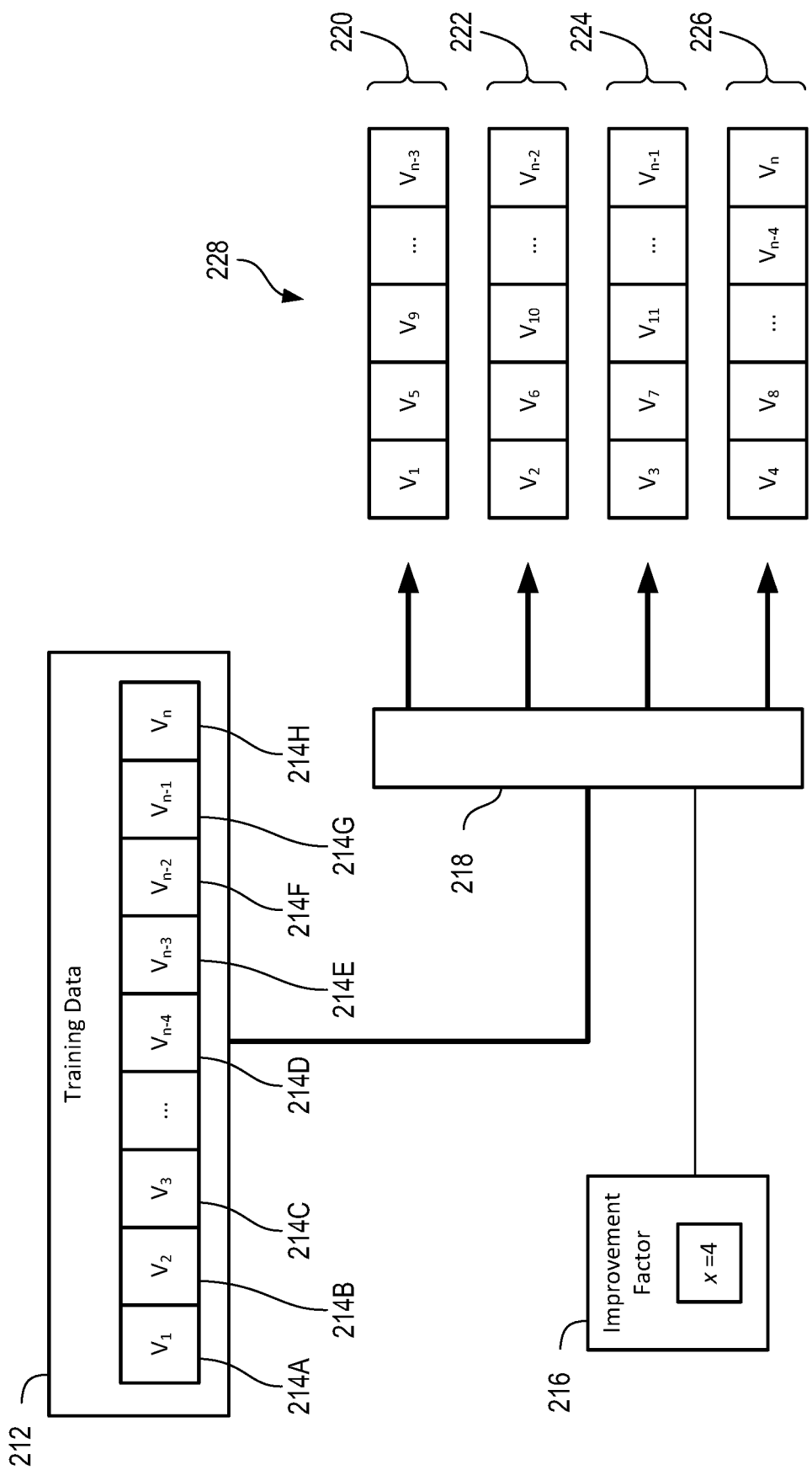
FIG. 2 is a schematic diagram depicting the partitioning of training data into training subsets, according to certain aspects of the present disclosure.

FIG. 2 is a schematic diagram depicting the partitioning of training data 212 into training subsets 220, 222, 224, 226, according to certain aspects of the present disclosure. Training data 212 can be any suitable training data acquired from a source of imaging data (e.g., imaging data source 102 of FIG. 1). Training data 212 is partitioned into the training subsets 220, 222, 224, 226 via a partitioning module 218, which can be implemented within a processing module (e.g., processing module 104).

The training data 212 includes n number of projections (e.g., projection $V_1$ 214A, projection $V_2$ 214B, projection $V_3$ 214C, projection $V_{n-4}$ 214D, projection $V_{n-3}$ 214E, projection $V_{n-2}$ 214F, projection $V_{n-1}$ 214G, and projection $V_n$ 214H. Each projection can represent imaging data acquired at a given time from passing radiation (e.g., X-rays) through the sample. Each projection can have acquisition parameters, such as exposure time, beam strength, and angle. Each projection in the training data 212 can have unique acquisition parameters (e.g., one or more of the acquisition parameters can be unique between projections). In an example, each projection in the training data 212 can be acquired at a different angle, such that n different angles are used to generate the n different projections. In another example, each projection in the training data 212 can be acquired with different exposure times and/or beam strengths, such that n different combinations of exposure time and/or beam strength are used to generate then different projections. In some cases, however, one or more projections in the training data 212 can be generated using the same acquisitions parameters as a prior projection.

The partitioning module 218 can partition the projections of the training data 212 into a collection 228 of subsets based on an improvement factor 216. The improvement factor 216 is a number used to facilitate suitable training of the neural network without the need to have an expert understanding of machine learning. When used to improve throughput, the improvement factor 216 can include or be known as a throughput factor. When used to improve de-noising, the improvement factor 216 can include or be known as a de-noising factor. The improvement factor can also include or be known as other artifact-specific factors (e.g., angular artifact improvement factor). The improvement factor 216 can be set automatically or based on user input (e.g., via input/output module 110). In some cases, the user is presented with a choice of available improvement factors (e.g., 2, 4, 6, etc.) that represent the multiplication of throughput or degree of de-noising desired. In some cases, the user can select the improvement factor 216 from a list of choices, although that need not always be the case. In some cases, the user may manually enter an improvement factor 216 or may select from a list of enumerated options (e.g., "Slow," "Medium," "Fast," and "Fastest") which correlate to given improvement factors 216. In yet another example, the improvement factor 216 can be set via a formula, such as calculated based on a user's selection of a desired result. For example, a user may input a maximum elapsed time for scanning and reconstruction, and the system can select an improvement factor 216 estimated to provide for scanning and reconstruction in a time at or less than the maximum elapsed time provided by the user.

In some cases, the choice of improvement factor 216 is limited to either the set of positive integers or the set of positive integers up to n divided by the minimum number of projections needed for reconstruction (e.g., for conventional reconstruction). For example, if at least 300 projections are needed for reconstruction and n=1600 total projections, the available improvement factors 216 may include 2, 3, 4, and 5, since n/300=5.33.

As depicted in FIG. 2, the improvement factor 216 is set to 4, although any other suitable improvement factor 216 could be used. The partitioning module 218 divides the training data 212 into the same number of subsets as the improvement factor 216. Thus, since the improvement factor 216 is set to 4, the training data 212 is divided into subset A 220, subset B 222, subset C 224, and subset D 226. Each of these subsets 220, 222, 224, 226 can contain unique projections from the training data 212, such that no projection is present in more than one of the subsets 220, 222, 224, 226. In some cases, each of the subsets 220, 222, 224, 226 contain the same number of projections, although that need not always be the case. For example, subset 220 may contain 400 projections while subset 222 contains 403 projections.

The projections can be partitioned according to any suitable scheme, such as an interlaced scheme. The interlaced scheme involves assigning sequential projections to alternating subsets 220, 222, 224, 226 such that each subsequent projection in any given subset is x projections away from the previous projection in that subset. In the example depicted in FIG. 2, for n total projections in the training data, subset A 220 includes projection $V_1$ 214A, projection $V_5$, projection $V_9$, up to projection $V_{n-3}$ 214E. Likewise, subset B 222 includes projection $V_2$ 214B, projection $V_6$, projection $V_{10}$, up to projection $V_{n-2}$ 214F. Likewise, subset C 226 includes projection $V_3$ 214C, projection $V_7$, projection $V_{11}$, up to projection $V_{n-1}$ 214G. Finally, subset D 228 includes projection $V_4$, projection $V_8$, up to projection $V_{n-4}$ 214D and projection $V_n$ 214H.

In some cases, the training data 212 can be collected such that sequential projections are collected using different acquisition parameters (e.g., angle or other parameter(s)), thus ensuring each subset of the collection 228 of subsets contains unique projections. Some schemes can result in the subsets containing different numbers of projections. Some schemes result in only two subsets, although that need not always be the case. In some cases, the training data can be partitioned into more than two subsets.

After partitioning at least two subsets of the collection 228 of subsets can be used to train a neural network. In some cases, all subsets of the collection 228 of subsets are used to train the neural network. In some cases, all subsets of the collection 228 of subsets except for one or more holdouts can be used to train the neural network, permitting the holdouts to be used to evaluate the trained neural network.

Figure 3:
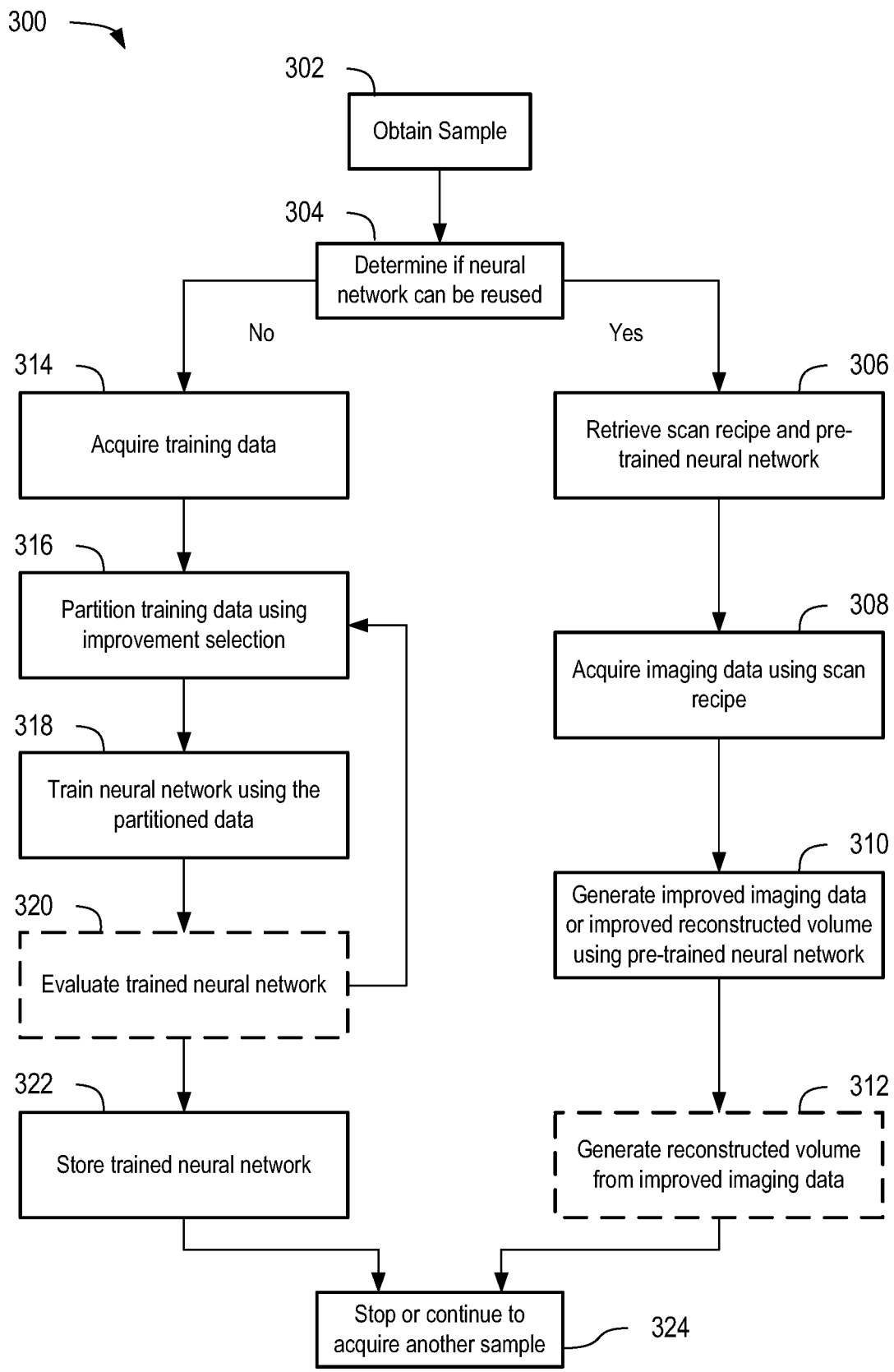
FIG. 3 is a flowchart depicting a process for processing imaging data, according to certain aspects of the present disclosure.

FIG. 3 is a flowchart depicting a process 300 for processing imaging data, according to certain aspects of the present disclosure. Process 300 can be performed using any suitable imaging data processing system, such as imaging data processing system 100 of FIG. 1. As described with reference to process 300, a neural network can be trained and applied to achieve improvements to imaging data and/or reconstructed volumes (e.g., reconstructed volume data sets). In some cases, the neural network can be a deep neural network, such as a convolutional neural network.

At block 302, a sample is obtained. The sample can be placed in position in an imager (e.g., CT scanner) for imaging. Imaging the sample using the imager can result in the acquisition of imaging data, which can be used for neural network training and/or generation of reconstructed volumes.

At block 304, a determination is made regarding whether or not an existing neural network can be reused. The determination can include determining whether or not the scan being attempted is of a new sample or a new acquisition. In some cases, the determination can be made by presenting a prompt to a user and receiving user input indicative of whether or not an existing neural network can be reused. In some cases, the determination can be automatically made, such as based on whether or not a neural network has already been trained for the sample being scanned. For example, if a trained neural network has just been added to the list of available neural networks (e.g., via blocks 314, 316, 318, 320, 322), that neural network may be used for subsequent scans of the same subject. In another example, when analyzing a series of similar samples, it may be prudent to continue using the same neural network for all samples of the series.

When the determination is made to use a pre-trained neural network, the process 300 can continue at block 306 with retrieval of a scan recipe and the pre-trained neural network. In some cases, the scan recipe is associated with the pre-trained neural network, although that need not always be the case. In some cases, the scan recipe can indicate the number of projections to be used, or other adjustable parameters. For example, for a given sample, the scan recipe and/or pre-trained neural network retrieved at block 306 can indicate that 400 projections are to be used, which can be a smaller number of projections than otherwise required for similar image quality using conventional reconstruction techniques.

At block 308, imaging data is acquired using the scan recipe acquired at block 306. The scan recipe can be used to control how the imager scans the sample, such as the number of projections to obtain and/or other controllable parameters. Since the pre-trained neural network is being used to de-noise the imaging data and/or reconstructed volume, the imaging data can be acquired at block 308 with a higher throughput than otherwise required for similar image quality using conventional reconstruction techniques, although that need not always be the case. In some cases, if the imaging data acquired at block 308 is acquired with the same throughput as otherwise used, the resultant imaging data or reconstructed volume may have improved image quality (e.g., improved de-noising, reduced angular artifacts, or other image quality improvements). In some cases, both improved throughput and improved image quality can be achieved.

At block 310, improved imaging data or an improved reconstructed volume can be generated using the pre-trained neural network acquired at block 306 and the imaging data acquired at block 308. In some cases, block 310 includes applying the pre-trained neural network to the imaging data in the projection domain to generate improved imaging data. When improved imaging data is generated at block 310, process 300 can optionally include generating, at block 312, a reconstructed volume from the improved imaging data generated at block 310 using traditional reconstruction techniques.

In some cases, block 310 includes applying the pre-trained neural network to a reconstructed volume in the volume domain to generate an improved reconstructed volume. In such cases, block 310 can include first generating a reconstructed volume from the imaging data from block 308 using traditional reconstruction techniques, before applying the pre-trained neural network to that reconstructed volume to generate the improved reconstructed volume.

In some cases, the neural network can be applied at block 310 to generate improved imaging data, while an additional neural network can be applied to the reconstructed volume from block 312 to generate a further improved reconstructed volume. This additional neural network can be accessed in a fashion similar to the neural network from r, such as or during block 306. The additional neural network can be trained similarly to how the neural network is trained as described herein with reference to blocks 314, 316, 318, 320, 322. When the additional neural network is trained, it can be trained using the same improvement selection used to generate the pre-trained neural network, or a different improvement selection.

At block 324, the process 300 can either stop, if no additional samples/acquisitions are needed, or repeat from block 302 or block 304 when additional samples/acquisitions are needed.

When the determination at block 304 is that a pre-trained neural network cannot be used, should not be used (e.g., that a new neural network is to be created or an existing neural network is to be further trained), or that a new neural network should be trained, the process 300 can continue at block 314.

At block 314, training data can be acquired. The training data can be acquired by selecting a subset of data from a full set of previously acquired imaging data (e.g., input imaging data), or by newly acquiring the training data (e.g., from an imager). The training data acquired at block 314 can be collected using parameters known to generally provide suitable image quality (e.g., low noise, low aliasing, and/or low presence of other artifacts) for the imaging data or reconstructed volume.

At block 316, the training data is automatically partitioned into subsets based on an improvement selection. The improvement selection can be a user-provided selection that identifies an improvement factor, although that need not always be the case. In some cases, an improvement selection can be based on user input (e.g., identifying an improvement factor, selecting a desired throughput, selecting a desired degree of de-noising or other image improvement, or making an enumerated speed or image improvement selection), in which case block 316 can include receiving the improvement selection from the user. In some cases, an improvement selection can be automatically selected (e.g., automatically selected to be the highest available improvement factor), such as without user input. Partitioning the training data at block 316 includes partitioning the training data acquired at block 314 into two or more subsets, such as described herein.

In some cases, automatic partitioning of the acquired training data at block 316 can include manually or automatically selecting a partitioning scheme. Each partitioning scheme can be partitioned into an appropriate number of subsets based on the improvement selection. In some cases, the partitioning scheme can include interleaved partitioning, in which case subsequent projections from the training data are placed in different subsets. In some cases, the partitioning scheme can be random, in which case the projections from the training data are randomly or pseudo-randomly placed into different subsets.

In some cases, a pre-determined sample-dependent partitioning scheme can be used, in which case certain projections from the training data are partitioned into specific subsets based on a pre-defined strategy selected for a given sample or a given category of sample. For example, for certain samples, it may be useful to always partition projection data acquired within a first range of angles (e.g., 0°-60°) into a first subset, projection data acquired at a second range of angles (e.g., 60°-120°) into a second subset, and projection data acquired at a third range of angles (e.g., 120°-180°) into a third subset.

In some cases, a dynamic sample-based partitioning scheme can be used, in which case the sample or a simulation of the sample can be analyzed to determine how the projections should be partitioned. Such analysis can include using reconstruction techniques (e.g., on the training data or on simulated data) or other techniques to identify artifacts or known artifact-generating features of the sample. For example, since edges can often cause aliasing artifacts, edges can be detected and used to indicate how projections should be partitioned. In an example, wherever an edge is detected or wherever an edge having a length greater than a threshold length is detected, the projections acquired from angles adjacent that edge can be partitioned in a pre-defined fashion (e.g., projections acquired on one side of the edge can be partitioned into a first subset and projections acquired on a second side of the edge can be partitioned into a second subset; or projections acquired adjacent an edge can be specifically partitioned in an interleaved fashion, while other projections may be partitioned in another fashion, such as randomly).

In some cases, certain aspects of dynamic sample-based partitioning can occur prior to block 314. For example, in some cases, pre-training imaging data can be acquired to simply identify artifacts or known artifact-generating features of the sample (e.g., edges). Then, a scan recipe can be generated or updated to include specifically acquiring projections based on the identified artifacts or known artifact-generating features. For example, when an edge is detected, the scan recipe can be adjusted to ensure extra projections are acquired adjacent the edge when the training data is acquired at block 314. Then, during partitioning at block 316, the extra projections can be partitioned accordingly.

In some cases, the partitioning scheme can include optimized partitioning, in which case the partitioning of training data into subsets can be tested and adjusted iteratively to maximize or minimize a cost function. For example, training data can be initially partitioned into a first set of subsets, which can be used as described herein, such as to generate an improved reconstructed volume. In some cases, after generating the improved reconstructed volume, the same training can be subsequently partitioned into a different set of subsets that differs from the first set of subsets. That second set of subsets can be used as described herein, such as to generate a second improved reconstructed volume. The first and second sets of subsets can then be compared based on a cost function to determine which of the first or second sets of subsets should be used to achieve the best result. Such optimization can continue for any number of iterations. In some cases, a separate neural network can be trained and applied to identify optimal partitioning of the training data.

At block 318, a neural network is trained using the partitioned data. At least two subsets of the partitioned data from block 316 can be used in the training of the neural network. When training the neural network in a volume domain, traditional reconstruction techniques can be used on each subset of training data to generate respective reconstructed volumes, which can then be used as inputs to the neural network to generate improved reconstructed volumes. The neural network can be trained to maximize any desired cost function, which may result in training the neural network to best improve the image quality of the reconstructed volume.

When training the neural network in a projection domain, each subset of training data can be separately supplied as input to the neural network to generate respective subsets of improved training data. In some cases, the neural network can be trained to maximize a desired cost function associated with the improved training data, which may result in training the neural network to best improve the image quality of the improved training data. In some cases, however, the improved training data associated with each of the subsets can be used to generate respective improved reconstructed volumes using traditional reconstruction techniques. In such cases, the neural network can be trained to maximize a desired cost function associated with the improved reconstructed volumes, which may result in training the neural network to best improve the image quality of the reconstructed volumes by altering imaging data to generate improved imaging data.

Training the neural network can include training a new neural network and/or further training a pre-trained neural network (e.g., a pre-trained neural network accessed in a fashion similar to block 306). In some cases, transfer learning techniques (such as re-training only a portion of the neural network) can be used to improve training time and/or reduce data requirements.

Any suitable neural network can be trained, such as a deep neural network. In some cases, a noise2noise (N2N) fashion can be used to conduct the neural network training. N2N de-noising can produce images with little or no noise, and with reduced, little, or no aliasing. N2N de-noising can relieve the user from having to obtain high-quality sample data. In some cases, antialiasing can be treated separately, such as if the subsets partitioned at block 316 contain projections taken at common angles.

In some cases, training can be performed in a fashion such that with additional training time, the precision of the neural network improves. In some cases, even early network states can strongly improve the image quality.

In some cases, at optional block 320, the trained neural network can be evaluated. Evaluation of the trained neural network can occur in any suitable fashion. In some cases, evaluation can include presenting, to a user, imaging data or a three-dimensional reconstructed volume (e.g., de-noised imaging data or a de-noised volume) made using the trained neural network (e.g., from training data, standardized imaging data, or other imaging data) and/or cost function value information (e.g., a convergence curve). A user can provide feedback regarding the image quality (e.g., a "yes" or "no" for acceptable quality, a number on a scale of 1-10, or the like) or cost function value information (e.g., an indication when the convergence curve has sufficiently converged). In some cases, evaluation can be automatic, such as by comparing the improved imaging data or improved reconstructed volume from the trained neural network to example imaging data or an example reconstructed volume from another technique (e.g., reconstructed volume of holdout data or alternate data) or by triggering based on the cost function value information (e.g., triggering when the cost function reaches a desired value). In some cases, automatic evaluation can involve applying a machine learning classifier to the improved imaging data and/or improved reconstructed volume to classify the output as sufficient or insufficient. In some cases, such a machine learning classifier can be a trained neural network classifier. In some cases, a Gaussian processes classifier can be used.

If the trained neural network evaluates negatively (e.g., the image quality is unsatisfactory or the cost function value is insufficient), the process 300 can go back to block 316 and a different (e.g., smaller) improvement factor can be used. In some cases, the new improvement factor can be user-provided (e.g., via a new improvement selection). In some cases, however, the new improvement factor can be automatically calculated based on the previous improvement factor (e.g., the new improvement factor can be the previous improvement factor decreased by one or by an amount proportional to the feedback).

If the trained neural network evaluates positively, the process 300 can continue to block 322. In some cases, evaluation of the trained neural network 320 can involve starting with a high improvement factor and repeating blocks 316, 318, 320 until the trained neural network evaluates positively. However, in some cases, an alternate approach can be used in which evaluation of the trained neural network 320 involves starting with a low improvement factor and repeating blocks 316, 318, 320 until the trained neural network no longer evaluates positively, in which case the improvement factor associated with the last positively evaluated trained neural network is selected for use.

At block 322, the trained neural network can be stored for later use. Storage of the trained neural network can include storing the neural network locally or remotely. The trained neural network can be stored as a pre-trained neural network, such as the pre-trained neural network reference with respect to blocks 304, 306, 310. In some cases, storing the trained neural network at block 322 can further include storing an associated scan recipe. The scan recipe can be based on the scan recipe used to acquire the training data from block 314 and can optionally include or use the improvement selection. For example, if the acquired training data included 1600 projections and the improvement factor is 2 or 4, the associated scan recipe may indicate the number of projections to use as 800 or 400, respectively.

In some cases, storing the trained neural network at block 322 can include transmitting the trained neural network to a remote server for federated learning, such as via a network interface (e.g., via the Internet). When received by the remote server, the trained neural network can be used, along with other neural networks trained from other samples and/or using other systems, to generate a collaborative pre-trained neural network. The collaborative pre-trained neural network can perform better than the individual neural networks used to generate it, and can be generated without the need to share the underlying data (e.g., training data from block 314) used to generate each of the constituent neural networks. Thus, the collaborative pre-trained neural network can achieve high efficacy by being based on many different sets of training data without the need for a single computing system to access all of the training data. This approach can allow for improved neural network training while maintaining the privacy of the underlying data. Once the collaborative pre-trained neural network is generated, it can be distributed. For example, at block 306, acquiring the pre-trained neural network can include acquiring the collaborative pre-trained neural network from the remote server (e.g., via a network interface).

While the blocks of process 300 are depicted and described in a particular order, in some cases the blocks or parts of blocks may be performed in other orders, including with some blocks removed and/or additional blocks added. For example, in some cases, the improvement selection from block 316 can be made prior to acquiring the training data at block 314, after which the training data can be partitioned according to the improvement selection at block 316. In another example, evaluation of the trained neural network at block 320 is skipped. In another example, process 300 can be performed without blocks 304, 322, 324, in which case blocks 314, 316, 318, 320 may be performed prior to performance of block 306, 308, 310, and in which case the pre-trained neural network retrieved at block 306 is the trained neural network from block 318 or block 320. In another example, process 300 can be performed without blocks 304, 322, 324, 306, 308, in which case blocks 314, 316, 318, 320 may be performed prior to performance of block 310 and optionally block 312, and in which case acquiring training data at block 314 further includes acquiring the imaging data used at block 310 to generate the improved imaging data or improved reconstructed volume. In another example, evaluation of the trained neural network at block 320 can occur after generation of the improved imaging data or improved reconstructed volume at block 310 and can use that improved imaging data or improved reconstructed volume in the evaluation of whether or not the trained neural network passes.

Figure 4:
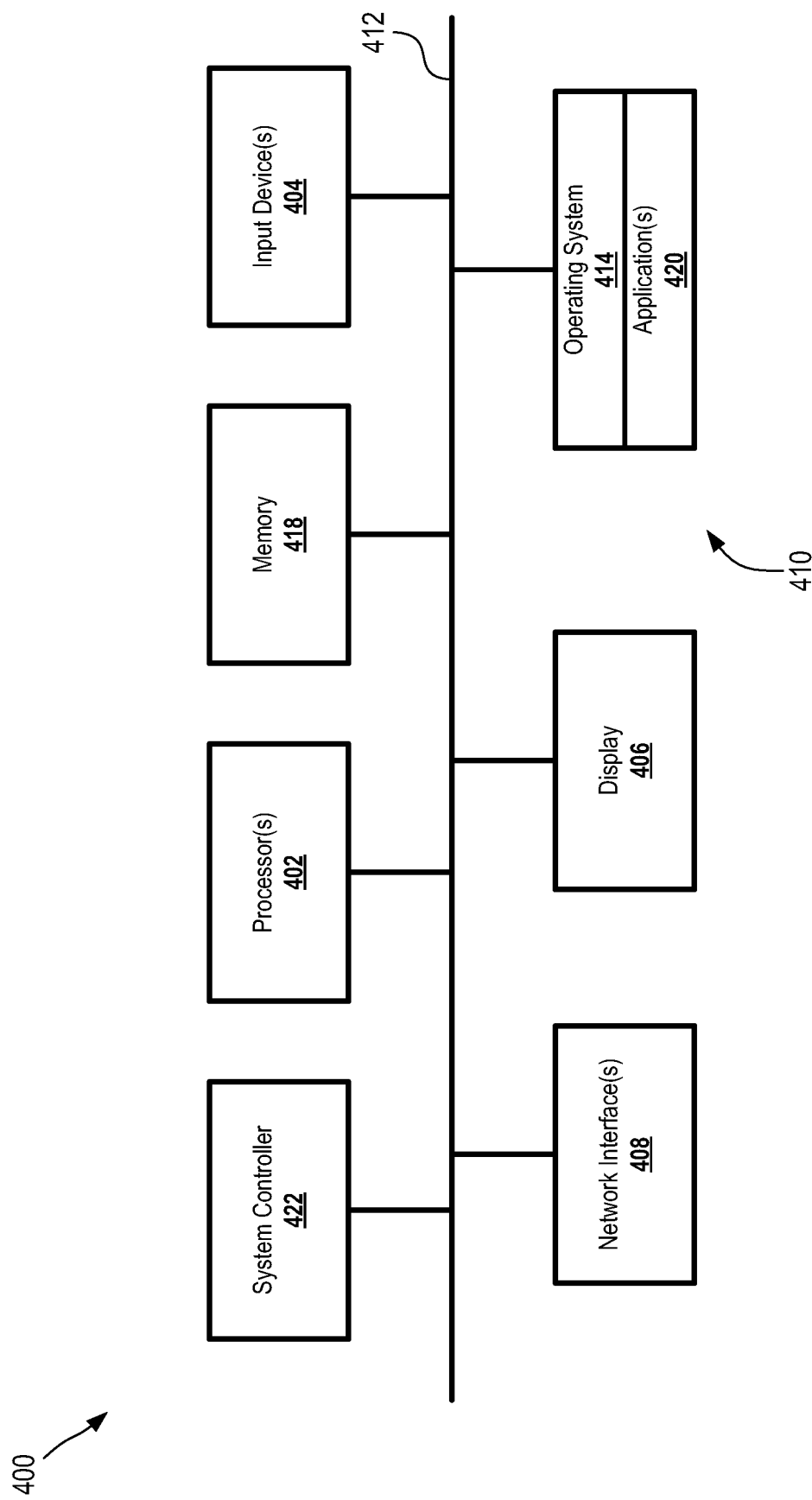
FIG. 4 is a block diagram depicting an example system architecture for implementing certain features and processes of the present disclosure.

FIG. 4 is a block diagram of an example system architecture 400 for implementing features and processes of the present disclosure, such as those presented with reference to FIGS. 1-3. The architecture 400 can be used to implement any suitable computing device (e.g., a server, workstation, tablet, cloud, or other such devices or services) for practicing the various features and processes of the present disclosure. The architecture 400 can be implemented on any electronic device that runs software applications derived from compiled instructions, including without limitation personal computers, servers, smart phones, electronic tablets, game consoles, email devices, imagers (e.g., imaging machines, such as X-ray microscopes and CT scanners) and the like. In some implementations, the architecture 400 can include one or more processors 402, one or more input devices 404, one or more display devices 406, one or more network interfaces 408, and one or more computer-readable mediums 410. Each of these components can be coupled by bus 412.

In some cases, system architecture 400 can be incorporated into a computing system capable of performing X-ray scans, such as a computing system used to control an X-ray imager or CT scanner. In some cases, system architecture 400 can be incorporated into a workstation computer used primarily for viewing and interpreting imaging data from an X-ray scan. In some cases, system architecture 400 can be incorporated into a computer system used to train neural networks, such as a computer system optimized for the training of deep neural networks.

In some implementations, system architecture 400 can correspond to a single server in a rack of servers. Various rack configurations can be implemented. For example, a rack can include multiple chassis and each chassis can contain multiple servers. Each server in the rack can be connected by various hardware components (e.g., backbone, middle plane, etc.).

Display device 406 can be any known display technology, including but not limited to display devices using Liquid Crystal Display (LCD) or Light Emitting Diode (LED) technology. Processor(s) 402 can use any known processor technology, including but not limited to graphics processors and multi-core processors. Input device 404 can be any known input device technology, including but not limited to a keyboard (including a virtual keyboard), mouse, track ball, and touch-sensitive pad or display. Bus 412 can be any known internal or external bus technology, including but not limited to ISA, EISA, PCI, PCI Express, NuBus, USB, Serial ATA or FireWire.

Computer-readable medium 410 can be any medium that participates in providing instructions to processor(s) 402 for execution, including without limitation, non-volatile storage media (e.g., optical disks, magnetic disks, flash drives, etc.) or volatile media (e.g., SDRAM, ROM, etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Processor(s) 402 can include any combination of suitable processors. Certain aspects of the present disclosure can be especially useful when implemented using one or more graphic processing units (GPUs), field-programmable gate arrays (FPGAs), and/or tensor processing units (TPUs) or other artificial intelligence accelerators. In some cases, certain instructions for executing code on GPUs, FPGAs, and/or TPUs can be programmed using an appropriate language (e.g., Compute Unified Device Architecture (CUDA) for certain GPUs, or a hardware description language for FPGAs).

Computer-readable medium 410 can include various instructions for implementing operating system 414 and applications 420 such as computer programs. The operating system can be multi-user, multiprocessing, multitasking, multithreading, real-time and the like. The operating system 414 performs basic tasks, including but not limited to: recognizing input from input device 404; sending output to display device 406; keeping track of files and directories on computer-readable medium 410; controlling peripheral devices (e.g., disk drives, printers, X-ray microscopes, etc.) which can be controlled directly or through an I/O controller; and managing traffic on bus 412. Computer-readable medium 410 can include various instructions for implementing firmware processes, such as a BIOS. Computer-readable medium 410 can include various instructions for implementing any of processes described herein, including at least process 300 of FIG. 3.

Memory 418 can include high-speed random access memory and/or non-volatile memory, such as one or more magnetic disk storage devices, one or more optical storage devices, and/or flash memory (e.g., NAND, NOR). The memory 418 (e.g., computer-readable storage devices, mediums, and memories) can include a cable or wireless signal containing a bit stream and the like. However, when mentioned, non-transitory computer-readable storage media expressly exclude media such as energy, carrier signals, electromagnetic waves, and signals per se. The memory 418 can store an operating system, such as Darwin, RTXC, LINUX, UNIX, OS X, WINDOWS, or an embedded operating system such as VxWorks.

System controller 422 can be a service processor that operates independently of processor 402. In some implementations, system controller 422 can be a baseboard management controller (BMC). For example, a BMC is a specialized service processor that monitors the physical state of a computer, network server, or other hardware device using sensors and communicating with the system administrator through an independent connection. The BMC is configured on the motherboard or main circuit board of the device to be monitored. The sensors of a BMC can measure internal physical variables such as temperature, humidity, power-supply voltage, fan speeds, communications parameters and operating system (OS) functions.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java, CUDA), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computing system that includes a back-end component, such as a data server, or that includes a middleware component, such as an application server or an Internet server, or that includes a front-end component, such as a client computer having a graphical user interface or an Internet browser, or any combination thereof. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an application programming interface (API). An API can define one or more parameters that are passed between a calling application and other software code (e.g., an operating system, library routine, function) that provides a service, that provides data, or that performs an operation or a computation. In an example, an API can be used to facilitate accessing and/or storing neural networks.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, and the like.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art. Numerous changes to the disclosed embodiments can be made in accordance with the disclosure herein, without departing from the spirit or scope of the disclosure. Thus, the breadth and scope of the present disclosure should not be limited by any of the above described embodiments.

Although certain aspects and features of the present disclosure have been illustrated and described with respect to one or more implementations, equivalent alterations and modifications will occur or be known to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application.

The terminology used herein is for the purpose of describing particular embodiments only, and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

As used below, any reference to a series of examples is to be understood as a reference to each of those examples disjunctively (e.g., "Examples 1-4" is to be understood as "Examples 1, 2, 3, or 4").

Example 1 is a method comprising: receiving training data of a sample, wherein the training data is acquired by an X-ray imager using training parameters; receiving an improvement selection; partitioning the training data into a plurality of training subsets using the improvement selection; generating a computed tomography (CT) training reconstructed volume for at least two of the plurality of training subsets; training a neural network using each of the CT training reconstructed volumes; receiving additional imaging data, wherein i) the additional imaging data is of the sample acquired using additional parameters different than the training parameters, or ii) the additional imaging data is of an additional sample acquired using the training parameters; and generating a CT reconstructed volume using the additional imaging data and the trained neural network.

Example 2 is the method of example(s) 1, wherein the additional imaging data is of the sample acquired using the additional parameters, and wherein the additional parameters are selected to achieve a greater throughput than the training parameters.

Example 3 is the method of example(s) 1 or 2, wherein the training parameters are associated with a training number of projections, wherein the additional parameters are associated with an additional number of projections that is smaller than the training number of projections; and wherein the method further comprises determining the additional number of projections using the training number of projections and the improvement selection.

Example 4 is the method of example(s) 3, wherein the improvement selection is an improvement factor, and wherein determining the additional number of projections includes dividing the training number of projections by the improvement factor.

Example 5 is the method of example(s) 1-4, wherein partitioning the training data into the plurality of training subsets using the improvement selection includes partitioning the training data into a number of training subsets, wherein the number of training subsets is selected using the improvement selection.

Example 6 is the method of example(s) 5, wherein the training data includes imaging data for a plurality of acquisitions, and wherein partitioning the training data into the number of training subsets using the improvement selection includes associating imaging data for sequential acquisitions of the plurality of acquisitions to alternate training subsets of the plurality of training subsets.

Example 7 is the method of example(s) 6, wherein sequential acquisitions of the plurality of acquisitions are acquired at different angles with respect to the sample.

Example 8 is the method of example(s) 7, wherein each sequential acquisition is angularly offset from a previous acquisition by an angle determined using golden ratio angle determination techniques.

Example 9 is the method of example(s) 6, wherein groups of sequential acquisitions of the plurality of acquisitions are acquired at common angles, and wherein each sequential acquisition of a group of sequential acquisitions is associated with a respective one of the plurality of training subsets.

Example 10 is the method of example(s) 1-9, further comprising receiving a region of interest (ROI) selection, wherein partitioning the training data into the plurality of training subsets includes using the ROI selection.

Example 11 is the method of example(s) 1-10, further comprising: receiving category identification information associated with the sample; and retrieving a pre-trained neural network using the category identification information, wherein the pre-trained neural network is trained on a different sample, wherein training the neural network includes further training the pre-trained neural network, and wherein generating the CT reconstructed volume using the additional imaging data and the trained neural network includes using the further trained pre-trained neural network.

Example 12 is the method of example(s) 1-11, further comprising: applying imaging corrections to the training data prior to generating the CT training reconstructed volumes; and applying the imaging corrections to the additional imaging data prior to generating the CT reconstructed volumes.

Example 13 is the method of example(s) 1-12, further comprising: determining that the trained neural network is insufficient; updating the improvement selection when the trained neural network is determined to be insufficient; repartitioning the training data into an updated plurality of training subsets using the updated improvement selection; generating an updated CT training reconstructed volume for the at least two of the updated plurality of training subsets; retraining the neural network using each of the updated CT training reconstructed volumes; and generating an updated CT reconstructed volume using the additional imaging data and the retrained neural network.

Example 14 is the method of example(s) 13, wherein determining that the trained neural network is insufficient includes: presenting i) cost function value information; ii) the CT reconstructed volume; iii) a trial CT reconstructed volume generated using the trained neural network and the training data; or iv) any combination of i-iii; and receiving user input indicative that the trained neural network is insufficient.

Example 15 is the method of example(s) 13, wherein determining that the trained neural network is insufficient is performed automatically using a machine learning classifier.

Example 16 is the method of example(s) 1-15, further comprising applying an angle-dependent weighting mask to the training data.

Example 17 is the method of example(s) 1-16, further comprising truncating each of the CT training reconstructed volumes in a Z direction prior to training the neural network.

Example 18 is the method of example(s) 1-17, further comprising: receiving category identification information associated with the sample; and storing the trained neural network in associated with the category identification information.

Example 19 is the method of example(s) 18, further comprising: transmitting the trained neural network via a network interface, wherein transmitting the trained neural network includes transmitting the category identification information; receiving a collaboratively trained neural network via the network interface, wherein the collaboratively trained neural network is based on the trained neural network and one or more additional trained neural networks associated with the category identification information; and storing the collaboratively trained neural network as a pre-trained neural network.

Example 20 is a system comprising: a control system including one or more processors; and a memory having stored thereon machine readable instructions; wherein the control system is coupled to the memory, and the method of example(s) 1-19 is implemented when the machine executable instructions in the memory are executed by at least one of the one or more processors of the control system.

Example 21 is a system for processing X-ray imaging data, the system including a control system configured to implement the method of example(s) 1-19.

Example 22 is a computer program product embodied on a non-transitory computer readable medium and comprising instructions which, when executed by a computer, cause the computer to carry out the method of example(s) 1-19.

Example 23 is a method comprising: receiving training data of a sample, wherein the training data is acquired by an X-ray imager using training parameters; receiving an improvement selection; partitioning the training data into a plurality of training subsets using the improvement selection; training a neural network using each of the training subsets, wherein training the neural network includes: generating improved training data for each of the training subsets using the neural network; and evaluating the neural network using the improved imaging data; receiving additional imaging data, wherein i) the additional imaging data is of the sample acquired using additional parameters different than the training parameters, or ii) the additional imaging data is of an additional sample acquired using the training parameters; generating improved additional imaging data using the additional imaging data and the trained neural network; and generating a computed tomography (CT) reconstructed volume using the improved additional imaging data.

Example 24 is the method of example(s) 23, wherein evaluating the neural network using the improved imaging data includes: generating a training CT reconstructed volume for each of the training subsets using the improved imaging data; and evaluating the neural networks using the training CT reconstructed volumes.

Example 25 is the method of example(s) 23 or 24, wherein the additional imaging data is of the sample acquired using the additional parameters, and wherein the additional parameters are selected to achieve a greater throughput than the training parameters.

Example 26 is the method of example(s) 23-25, wherein the training parameters are associated with a training number of projections, wherein the additional parameters are associated with an additional number of projections that is smaller than the training number of projections; and wherein the method further comprises determining the additional number of projections using the training number of projections and the improvement selection.

Example 27 is the method of example(s) 26, wherein the improvement selection is an improvement factor, and wherein determining the additional number of projections includes dividing the training number of projections by the improvement factor.

Example 28 is the method of example(s) 23-27, wherein partitioning the training data into the plurality of training subsets using the improvement selection includes partitioning the training data into a number of training subsets, wherein the number of training subsets is selected using the improvement selection.

Example 29 is the method of example(s) 28, wherein the training data includes imaging data for a plurality of acquisitions, and wherein partitioning the training data into the number of training subsets using the improvement selection includes associating imaging data for sequential acquisitions of the plurality of acquisitions to alternate training subsets of the plurality of training subsets.

Example 30 is the method of example(s) 29, wherein sequential acquisitions of the plurality of acquisitions are acquired at different angles with respect to the sample.

Example 31 is the method of example(s) 30 wherein each sequential acquisition is angularly offset from a previous acquisition by an angle determined using golden ratio angle determination techniques.

Example 32 is the method of example(s) 29, wherein groups of sequential acquisitions of the plurality of acquisitions are acquired at common angles, and wherein each sequential acquisition of a group of sequential acquisitions is associated with a respective one of the pluralities of training subsets.

Example 33 is the method of example(s) 23-32, further comprising receiving a region of interest (ROI) selection, wherein partitioning the training data into the plurality of training subsets includes using the ROI selection.

Example 34 is the method of example(s) 23-33, further comprising: receiving category identification information associated with the sample; and retrieving a pre-trained neural network using the category identification information, wherein the pre-trained neural network is trained on a different sample, wherein training the neural network includes further training the pre-trained neural network, and wherein generating the improved imaging data using the additional imaging data and the trained neural network includes using the further trained pre-trained neural network.

Example 35 is the method of example(s) 23, further comprising: generating a training CT reconstructed volume for each of the training subsets using the improved imaging data; and training an additional neural network in a volume domain using the improved imaging data and the CT training reconstructed volumes, wherein the neural network is in a projection domain, and wherein generating the CT reconstructed volume using the improved additional imaging data further comprises using the trained additional neural network.

Example 36 is the method of example(s) 23-35, further comprising: determining that the trained neural network is insufficient; updating the improvement selection when the trained neural network is determined to be insufficient; repartitioning the training data into an updated plurality of training subsets using the updated improvement selection; retraining the neural network using each of the updated training subsets; generating updated improved additional imaging data using the additional imaging data and the retrained neural network; and generating an updated CT reconstructed volume using the improved additional imaging data.

Example 37 is the method of example(s) 36, wherein determining that the trained neural network is insufficient includes: presenting i) cost function value information; ii) the CT reconstructed volume; iii) a trial CT reconstructed volume generated using the improved imaging data and the trained neural network; or iv) any combination of i-iii; and receiving user input indicative that the trained neural network is insufficient.

Example 38 is the method of example(s) 36, wherein determining that the trained neural network is insufficient is performed automatically using a machine learning classifier.

Example 39 is the method of example(s) 23-38, further comprising applying an angle-dependent weighting mask to the training data.

Example 40 is the method of example(s) 23-39, wherein training the neural network further includes truncating each of the CT training reconstructed volumes in a Z direction prior to evaluating the neural network.

Example 41 is the method of example(s) 23-40, further comprising: receiving category identification information associated with the sample; and storing the trained neural network in associated with the category identification information.

Example 42 is the method of example(s) 41, further comprising: transmitting the trained neural network via a network interface, wherein transmitting the trained neural network includes transmitting the category identification information; receiving a collaboratively trained neural network via the network interface, wherein the collaboratively trained neural network is based on the trained neural network and one or more additional trained neural networks associated with the category identification information; and storing the collaboratively trained neural network as a pre-trained neural network.

Example 43 is a system comprising: a control system including one or more processors; and a memory having stored thereon machine readable instructions; wherein the control system is coupled to the memory, and the method of example(s) 23-42 is implemented when the machine executable instructions in the memory are executed by at least one of the one or more processors of the control system.

Example 44 is a system for processing X-ray imaging data, the system including a control system configured to implement the method of example(s) 23-42.

Example 45 is a computer program product embodied on a non-transitory computer readable medium and comprising instructions which, when executed by a computer, cause the computer to carry out the method of example(s) 23-42.

Example 46 is a method comprising: receiving identification information associated with a sample; selecting a trained neural network using the received identification information; receiving imaging data associated with the sample; applying the trained neural network to the imaging data to generate improved imaging data; and generating a computed tomography (CT) reconstructed volume using the improved imaging data.

Example 47 is a method comprising: receiving identification information associated with a sample; selecting a trained neural network using the received identification information; receiving imaging data associated with the sample; generating a computed tomography (CT) reconstructed volume using the imaging data; and applying the trained neural network to the CT reconstructed volume to generate an improved CT reconstructed volume.

Example 48 is the method of example(s) 46 or 47, wherein the trained neural network is trained using training data that is partitioned into subsets according to a provided improvement selection.

Example 49 is the method of example(s) 48, wherein the training data is acquired from the sample.

Example 50 is the method of example(s) 48, wherein the training data is acquired from an additional sample, wherein the additional sample is associated with additional identification information, and wherein the additional identification information associated with the additional sample is the same as the received identification information associated with the sample.

What is claimed is:

1. A method comprising:
   receiving training data of a sample, wherein the training data is acquired by an X-ray imager using training parameters;
   receiving an improvement selection;
   partitioning the training data into a plurality of unique training subsets using the improvement selection;
   generating computed tomography (CT) training reconstructed volumes using the plurality of unique training subsets;
   training a neural network using each of the CT training reconstructed volumes;
   receiving additional imaging data, wherein i) the additional imaging data is of the sample acquired using additional parameters different than the training parameters, or ii) the additional imaging data is of an additional sample acquired using the training parameters; and
   generating a CT reconstructed volume using the additional imaging data and the trained neural network.

2. The method of claim 1, wherein the additional imaging data is of the sample acquired using the additional parameters, and wherein the additional parameters are selected to achieve a greater throughput than the training parameters.

3. The method of claim 1, wherein the training parameters are associated with a training number of projections, wherein the additional parameters are associated with an additional number of projections that is smaller than the training number of projections; and wherein the method further comprises determining the additional number of projections using the training number of projections and the improvement selection.

4. The method of claim 3, wherein the improvement selection is an improvement factor, and wherein determining the additional number of projections includes dividing the training number of projections by the improvement factor.

5. The method of claim 1, wherein partitioning the training data into the plurality of unique training subsets using the improvement selection includes partitioning the training data into a number of unique training subsets, wherein the number of unique training subsets is selected using the improvement selection.

6. The method of claim 5, wherein the training data includes imaging data for a plurality of acquisitions, and wherein partitioning the training data into the number of unique training subsets using the improvement selection includes associating imaging data for sequential acquisitions of the plurality of acquisitions to alternate training subsets of the plurality of unique training subsets.

7. The method of claim 6, wherein sequential acquisitions of the plurality of acquisitions are acquired at different angles with respect to the sample.

8. The method of claim 7, wherein each sequential acquisition is angularly offset from a previous acquisition by an angle determined using golden ratio angle determination techniques.

9. The method of claim 6, wherein groups of sequential acquisitions of the plurality of acquisitions are acquired at common angles, and wherein each sequential acquisition of a group of sequential acquisitions is associated with a respective one of the plurality of unique training subsets.

10. The method of claim 1, further comprising receiving a region of interest (ROI) selection, wherein partitioning the training data into the plurality of unique training subsets includes using the ROI selection.

11. The method of claim 1, further comprising:
    receiving category identification information associated with the sample; and
    retrieving a pre-trained neural network using the category identification information, wherein the pre-trained neural network is trained on a different sample, wherein training the neural network includes further training the pre-trained neural network, and wherein generating the CT reconstructed volume using the additional imaging data and the trained neural network includes using the further trained pre-trained neural network.

12. The method of claim 1, further comprising:
    applying imaging corrections to the training data prior to generating the CT training reconstructed volumes; and
    applying the imaging corrections to the additional imaging data prior to generating the CT reconstructed volume.

13. The method of claim 1, further comprising:
    determining that the trained neural network is insufficient;
    updating the improvement selection when the trained neural network is determined to be insufficient;
    repartitioning the training data into an updated plurality of unique training subsets using the updated improvement selection;
    generating updated CT training reconstructed volumes using the updated plurality of unique training subsets;
    retraining the neural network using each of the updated CT training reconstructed volumes; and
    generating an updated CT reconstructed volume using the additional imaging data and the retrained neural network.

14. The method of claim 13, wherein determining that the trained neural network is insufficient includes:
    presenting i) cost function value information; ii) the CT reconstructed volume; iii) a trial CT reconstructed volume generated using the trained neural network and the training data; or iv) any combination of i-iii; and
    receiving user input indicative that the trained neural network is insufficient.

15. The method of claim 13, wherein determining that the trained neural network is insufficient is performed automatically using a machine learning classifier.

16. The method of claim 1, further comprising applying an angle-dependent weighting mask to the training data.

17. The method of claim 1, further comprising truncating each of the CT training reconstructed volumes in a Z direction prior to training the neural network.

18. The method of claim 1, further comprising:
    receiving category identification information associated with the sample; and
    storing the trained neural network in associated with the category identification information.

19. The method of claim 18, further comprising:
transmitting the trained neural network via a network interface, wherein transmitting the trained neural network includes transmitting the category identification information;
receiving a collaboratively trained neural network via the network interface, wherein the collaboratively trained neural network is based on the trained neural network and one or more additional trained neural networks associated with the category identification information; and
storing the collaboratively trained neural network as a pre-trained neural network.

20. A system comprising:
a control system including one or more processors; and
a memory having stored thereon machine readable instructions;
wherein the control system is coupled to the memory, and the method of claim 1 is implemented when the machine executable instructions in the memory are executed by at least one of the one or more processors of the control system.

21. A system for processing X-ray imaging data, the system including a control system configured to implement the method of claim 1.

22. A computer program product embodied on a non-transitory computer readable medium and comprising instructions which, when executed by a computer, cause the computer to carry out the method of claim 1.

23. A method comprising:
receiving training data of a sample, wherein the training data is acquired by an X-ray imager using training parameters;
receiving an improvement selection;
partitioning the training data into a plurality of unique training subsets using the improvement selection;
training a neural network using each of the unique training subsets, wherein training the neural network includes:
generating improved imaging data for each of the plurality of unique training subsets by applying the neural network to each of the plurality of unique training subsets; and
evaluating the neural network using the improved imaging data;
receiving additional imaging data, wherein i) the additional imaging data is of the sample acquired using additional parameters different than the training parameters, or ii) the additional imaging data is of an additional sample acquired using the training parameters;
generating improved additional imaging data using the additional imaging data and the trained neural network; and
generating a computed tomography (CT) reconstructed volume using the improved additional imaging data.

24. The method of claim 23, wherein evaluating the neural network using the improved imaging data includes:
generating a training CT reconstructed volume for each of the unique training subsets using the improved imaging data; and
evaluating the neural networks using the training CT reconstructed volumes.

25. The method of claim 23, wherein the additional imaging data is of the sample acquired using the additional parameters, and wherein the additional parameters are selected to achieve a greater throughput than the training parameters.

26. The method of claim 23, wherein the training parameters are associated with a training number of projections, wherein the additional parameters are associated with an additional number of projections that is smaller than the training number of projections; and wherein the method further comprises determining the additional number of projections using the training number of projections and the improvement selection.

27. The method of claim 26, wherein the improvement selection is an improvement factor, and wherein determining the additional number of projections includes dividing the training number of projections by the improvement factor.

28. The method of claim 23, wherein partitioning the training data into the plurality of unique training subsets using the improvement selection includes partitioning the training data into a number of unique training subsets, wherein the number of unique training subsets is selected using the improvement selection.

29. The method of claim 28, wherein the training data includes imaging data for a plurality of acquisitions, and wherein partitioning the training data into the number of unique training subsets using the improvement selection includes associating imaging data for sequential acquisitions of the plurality of acquisitions to alternate training subsets of the plurality of unique training subsets.

30. The method of claim 29, wherein sequential acquisitions of the plurality of acquisitions are acquired at different angles with respect to the sample.

31. The method of claim 30 wherein each sequential acquisition is angularly offset from a previous acquisition by an angle determined using golden ratio angle determination techniques.

32. The method of claim 30, wherein groups of sequential acquisitions of the plurality of acquisitions are acquired at common angles, and wherein each sequential acquisition of a group of sequential acquisitions is associated with a respective one of the plurality of unique training subsets.

33. The method of claim 23, further comprising receiving a region of interest (ROI) selection, wherein partitioning the training data into the plurality of unique training subsets includes using the ROI selection.

34. The method of claim 23, further comprising:
receiving category identification information associated with the sample; and
retrieving a pre-trained neural network using the category identification information, wherein the pre-trained neural network is trained on a different sample, wherein training the neural network includes further training the pre-trained neural network, and wherein generating the improved imaging data using the additional imaging data and the trained neural network includes using the further trained pre-trained neural network.

35. The method of claim 23, further comprising:
generating a training CT reconstructed volume for each of the unique training subsets using the improved imaging data; and
training an additional neural network in a volume domain using the improved imaging data and the CT training reconstructed volumes, wherein the neural network is in a projection domain, and wherein generating the CT reconstructed volume using the improved additional imaging data further comprises using the trained additional neural network.

36. The method of claim 23, further comprising:
determining that the trained neural network is insufficient;
updating the improvement selection when the trained neural network is determined to be insufficient;

repartitioning the training data into an updated plurality of unique training subsets using the updated improvement selection;

retraining the neural network using each of the updated unique training subsets;

generating updated improved additional imaging data using the additional imaging data and the retrained neural network; and generating an updated CT reconstructed volume using the improved additional imaging data.

37. The method of claim 36, wherein determining that the trained neural network is insufficient includes:

presenting i) cost function value information; ii) the CT reconstructed volume; iii) a trial CT reconstructed volume generated using the improved imaging data and the trained neural network; or iv) any combination of i-iii; and receiving user input indicative that the trained neural network is insufficient.

38. The method of claim 36, wherein determining that the trained neural network is insufficient is performed automatically using a machine learning classifier.

39. The method of claim 23, further comprising applying an angle-dependent weighting mask to the training data.

40. The method of claim 23, wherein training the neural network further includes truncating each of the CT training reconstructed volumes in a Z direction prior to evaluating the neural network.

41. The method of claim 23, further comprising:

receiving category identification information associated with the sample; and storing the trained neural network in associated with the category identification information.

42. The method of claim 41, further comprising:

transmitting the trained neural network via a network interface, wherein transmitting the trained neural network includes transmitting the category identification information;

receiving a collaboratively trained neural network via the network interface, wherein the collaboratively trained neural network is based on the trained neural network and one or more additional trained neural networks associated with the category identification information; and storing the collaboratively trained neural network as a pre-trained neural network.

43. A system comprising:

a control system including one or more processors; and a memory having stored thereon machine readable instructions;

wherein the control system is coupled to the memory, and the method of claim 23 is implemented when the machine executable instructions in the memory are executed by at least one of the one or more processors of the control system.

44. A system for processing X-ray imaging data, the system including a control system configured to implement the method of claim 23.

45. A computer program product embodied on a non-transitory computer readable medium and comprising instructions which, when executed by a computer, cause the computer to carry out the method of claim 23.

* * * * *